UNITED STATES PATENT OFFICE.

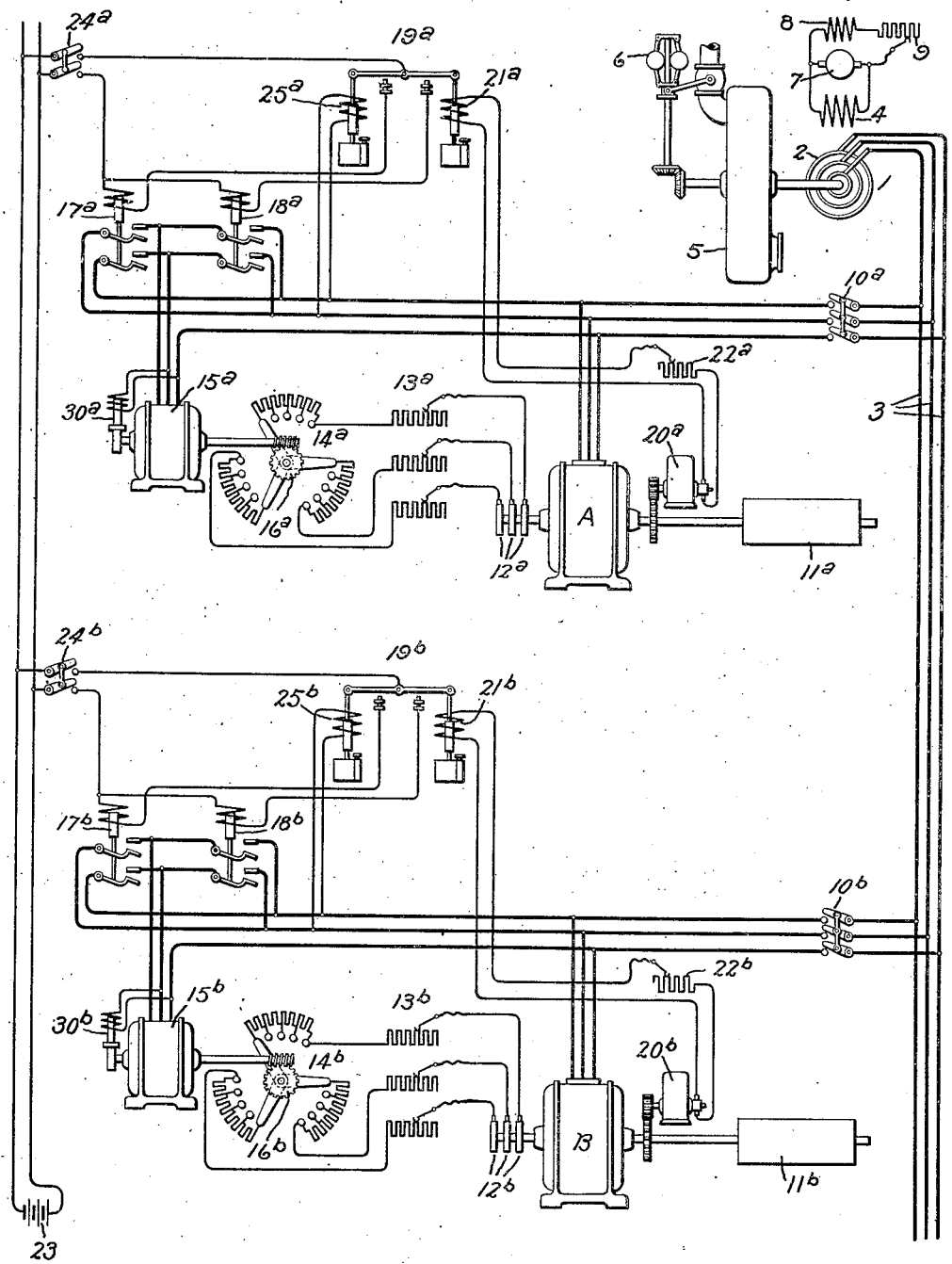

HARRY A. LAYCOCK, OF SCHENECTADY, NEW YORK, ASSIGNOR TO GENERAL ELECTRIC COMPANY, A CORPORATION OF NEW YORK.

SYSTEM OF SPEED REGULATION AND CONTROL OF INDUCTION MOTORS.

1,408,211.  Specification of Letters Patent.  Patented Feb. 28, 1922.

Application filed August 8, 1919. Serial No. 316,329.

*To all whom it may concern:*

Be it known that I, HARRY A. LAYCOCK, a citizen of the United States, residing at Schenectady, in the county of Schenectady, State of New York, have invented certain new and useful Improvements in a System of Speed Regulation and Control of Induction Motors, of which the following is a specification.

My invention relates to systems of speed regulation and control of induction motors.

In certain installations, for example where a plurality of induction motors are used to drive the grinding rolls in sugar, paper, or rubber mills, it is often necessary to have the motors operate at different constant speeds. It is also, desirable, under certain circumstances, as for example when the supply of material being ground is insufficient to maintain the mill operating at its normal output, to decrease the speed of each driving motor a certain per cent in order to reduce the output of the rolls a corresponding per cent and thereby keep the mill in operation. In order to have the material go through the successive rolls in the proper manner, it is necessary to maintain at all times the same relation between the speeds of the motors. Therefore, it is necessary to provide means for maintaining this relation when the speeds of the motors are changed, and also to maintain the new speeds of the motors constant. Furthermore it is desirable to operate at the reduced capacity with the same efficiency as when the motors are operating at their normal capacity.

The object of my invention is to provide a system of control whereby the above mentioned desired results are obtained.

In accordance with one feature of my invention, I employ induction motors having phase wound secondary windings, a variable resistance in each of the secondary circuits of said motors, a source of electrical energy connected to the primary windings of said motors, means for arbitrarily regulating said source to change an electrical condition of the energy, such as the voltage, supplied to said motors, and speed regulating means associated with each motor and responsive to said electrical condition for automatically varying the resistance in the secondary circuit of the motor with which it is associated so that the speed thereof is changed the same per cent as the electrical condition, when the latter is changed. In this way it will be observed that I am able to change the speeds of all the motors without changing their relative speeds.

In accordance with another feature of my invention I provide means for arbitrarily changing the frequency of the current supplied to motors, and means for automatically varying the resistance in the secondary circuits of the motors so as to maintain a predetermined relation between the speed of each motor and the synchronous speed thereof as the frequency of the current supplied thereto is varied. It is evident, that the slip of each motor remains constant, as the synchronous speed thereof is changed, and therefore the efficiency of each motor remains approximately constant.

Other features of my invention will appear from the following description and claims, reference being had to the single figure of the accompanying drawing which is a diagrammatic view of a system of regulating and control embodying my invention.

Referring to the drawing, 1 represents a source of electrical energy which is illustrated as being a three phase alternating current generator having an armature 2, connected to a three phase distribution circuit 3, and a field winding 4. The armature 2 is shown as being driven by a turbine 5 the speed of which can be arbitrarily varied by changing the setting of the governor 6. It is to be understood that my invention is not limited, however, to any particular driving means, nor to any particular means for varying the speed thereof. The field winding 4 of the generator 1 is connected to the exciter 7 which is provided with a shunt field winding 8 and a resistance 9, which can be arbitrarily varied, connected in series therewith.

In actual practice, a voltage regulator may be used to control the energization of the field winding 4 so as to hold the voltage of the generator 2 constant at a predetermined value, but in order to simplify the disclosure, I have not illustrated such a regulator.

A and B represent two induction motors having primary windings which are adapted to be connected to the distribution circuit 3 by means of switches $10^a$ and $10^b$ and secondary windings which are connected to the collector rings $12^a$ and $12^b$, through which connections are established to the adjustable resistances $13^a$ and $13^b$ and the regulating resistances $14^a$ and $14^b$. For the sake of illustration, the motors A and B are shown as being connected to rolls $11^a$ and $11^b$.

$15^a$ and $15^b$ denote resistance varying means for regulating the amount of the resistances $14^a$ and $14^b$ in the secondary circuits of the motors A and B, and as illustrated, comprise induction motors having primary windings, which are adapted to be connected to the distribution circuit 3. Rotatable contact members $16^a$ and $16^b$ are operatively connected to the rotors of the motors $15^a$ and $15^b$ and are adapted to engage taps of the resistance $14^a$ and $14^b$. The connections between the primary windings of the induction motors $15^a$ and $15^b$ and the distribution circuit 3 are controlled by means of the contactors $17^a$ and $18^a$, contactors $17^b$ and $18^b$, and balance relays $19^a$ and $19^b$.

Direct current generators $20^a$ and $20^b$, which are shown as magnetos, are mechanically connected to the induction motors A and B, and are electrically connected through adjustable resistances $22^a$ and $22^b$ to coils $21^a$ and $21^b$ of the balance relays $19^a$ and $19^b$. The generators $20^a$ and $20^b$ are designed to generate voltages which vary directly with their speeds. The opposing coils $25^a$ and $25^b$ of the relays $19^a$ and $19^b$ are adapted to be connected to one phase of the distribution circuit 3 when the switches $10^a$ and $10^b$ are closed.

When the motors A and B are operating at their normal speeds, the voltages applied to the coils $21^a$ and $21^b$ are of such values that the forces exerted by these relays just balance the forces exerted by the opposing coils $25^a$ and $25^b$.

Circuits for energizing the operating coils of the contactors $17^a$ and $18^a$ and contactors $17^b$ and $18^b$ are adapted to be completed to a source of current 23 through switches $24^a$ and $24^b$ and contacts of the balance relays $19^a$ and $19^b$.

$30^a$ and $30^b$ represent electromagnetically controlled friction brakes for the motors $15^a$ and $15^b$. These brakes are adapted to be applied at all times, except when current is being supplied to the motors, and the purpose thereof is to bring the motors to a stop quickly when the circuits of the motors are opened.

The operation of the system, as at present understood, is as follows:

Let it be assumed that the speed of the turbine 5 is adjusted so that the frequency of the current supplied to the distribution circuit 3 by the generator 1 is a predetermined value and that the excitation of the generator 1 is regulated so that the voltage of the distribution system is also a predetermined value. Let it be assumed also that the switches $10^a$ and $10^b$ and the switches $24^a$ and $24^b$ are closed and the motors A and B are running at their normal speeds.

Under such conditions the opposing coils of the balance relay $19^a$ and $19^b$ just balance each other and occupy the positions shown in the drawing. If the speed of one of the motors, for example motor A, decreases, the voltage of the magneto $20^a$ also decreases so that the force exerted by the coil $25^a$ exceeds that exerted by coil $21^a$. Consequently the balance relay $19^a$ is operated in a clockwise direction and closes the circuit for the energizing coil of contactor $18^a$, whereupon the contactor $18^a$ is closed and completes a circuit for the motor $15^a$ so as to rotate the contact member $16^a$ in a clockwise direction and thereby exclude portions of the resistance $14^a$ from the secondary circuit of the induction motor A. The motor speed will accordingly increase and restore the balanced relation between the two coils of the relay $19^a$. If the speed of the motor increases above its normal value it is evident that the balance relay $19^a$ is operated in a counter-clockwise direction and closes the circuit for the energizing coil of the contactor $17^a$ which, in turn, operates to close a circuit for the motor $15^a$ to rotate the contact member $16^a$ in a counter-clockwise direction to insert portions of the resistance $14^a$ in the secondary circuit of the motor A. The speed of the motor B is held constant in a similar manner by means of the balance relay $19^b$. It will be evident that normal speeds of the motors A and B can be readily adjusted to any desired value by varying the resistance $22^a$ and $22^b$.

From the forgoing it is evident that the speed of each motor can be automatically maintained constant at any predetermined value.

Let it now be assumed that it is desired to decrease the speeds of all motors connected to the distribution circuit 3 a certain per cent, say 10% of their normal speeds. This is accomplished by changing the setting of the governor 6, so as to decrease the speed of the generator 1 to a value such that the frequency of the current supplied by the generator 1 to the distribution circuit 3 is reduced to 90% of its normal value, and by regulating the resistance 9 so as to reduce the voltage generated at the new speed to 90% of its normal value. It is to be understood, however, that my invention is not limited to the particular means shown in the drawing for varying the frequency and the voltage. Since the voltage supplied to the coils $25^a$ and $25^b$ is reduced 10%, the motors $15^a$ and $15^b$ are operated in the manner above described to insert resistances in the secondary circuits of the motors A and B, to decrease the speeds thereof to values such that the voltages generated by the magnetos $20^a$ and $20^b$ are decreased 10%. Since the voltages of these magnetos $20^a$ and $20^b$ vary directly with the speeds thereof, it is evident that the speeds of the motors A and B are automatically decreased the same per cent as the voltages of the magnetos $20^a$ and $20^b$.

Since the frequency of the current supplied to the motors is also varied the same per cent as the speeds of the motors, it follows that the relations between the actual speeds and synchronous speeds of the motors are not changed, that is the slip of each motor remains constant when the frequency is changed. Consequently, the efficiencies thereof remain approximately constant. For example, let it be assumed that the normal synchronous speed of motor A is 1800 R. P. M. and its normal speed at 60 cycles is 1700 R. P. M. If the frequency is reduced 10%, that is, to 54 cycles and the voltage a corresponding per cent, the new snychronous speed is 1,620 R. P. M. and the new speed produced by the regulating means is 1,530 R. P. M. Therefore, the relation between the normal speed and the synchronous speed in both cases is the same, that is 1700 divided by 1800 is equal to 1530 divided by 1620. It will be evident also that the new speeds of the motors will be maintained constant by the speed regulating means as long as the new frequency and voltage of the generator remain constant.

While I have herein shown and described one modification and application of my invention, I do not desire to be limited to the exact arrangement shown and described but seek to cover in the appended claims all those modifications and applications which come within the true spirit and scope of my invention.

What I claim as new and desire to secure by Letters Patent of the United States is:

1. In combination, a plurality of induction motors having phase wound secondary windings, a variable resistance in the secondary circuit of each motor, a source of electrical energy connected to the primary windings of said motors, means for arbitrarily regulating said source to change an electrical condition of the energy supplied to said motors, and speed regulating means associated with each motor and responsive to said electrical condition of the energy supplied by said source, for automatically varying the resistance in the secondary circuit of the motor with which it is associated so that the speed thereof is changed the same per cent as said electrical condition when the latter is changed.

2. In combination, a plurality of induction motors having phase wound secondary windings, a variable resistance in the secondary circuit of each motor, a source of electrical energy connected to the primary windings of said motors, means for arbitrarily regulating said source to change an electrical condition of the energy supplied to said motors, and speed regulating means associated with each motor and responsive to said electrical condition of the energy supplied by said source, each of said regulating means being arranged to automatically vary the resistance in the secondary circuit of the motor with which it is associated so that the speed of the motor is maintained constant at a predetermined value when said electrical condition of the source remains constant and so that the speed thereof is changed the same per cent as the electrical condition when the latter is changed.

3. In combination, a plurality of induction motors having phase wound secondary windings, a variable resistance in the secondary circuit of each motor, a source of electrical energy connected to the primary windings of said motors, means for arbitrarily regulating said source to change the voltage thereof, and speed regulating means for each motor responsive to the voltage of said source for automatically varying the resistance in the secondary circuit of the motor with which it is associated so that the speed thereof is changed the same per cent as the voltage when the latter is changed.

4. In combination, a plurality of induction motors having phase wound secondary windings, a variable resistance in the secondary circuit of each motor, a source of electrical energy connected to the primary windings of said motors, means for arbitrarily regulating said source to change the voltage thereof, and speed regulating means for each motor responsive to the voltage of said source, each of said regulating means being arranged to automatically vary the resistance in the secondary circuit of the motor with which it is associated so that the speed of the motor is maintained constant at a predetermined value when the voltage of the source remains constant and so that the speed thereof is changed the same per cent as the voltage when the latter is changed.

5. In combination, a plurality of induction motors having phase wound secondary windings, a variable resistance in the secondary circuit of each motor, a source of electrical energy connected to the primary windings of said motors, means for arbitrarily regulating said source to change the frequency of the current and the voltage supplied thereby to said motors, and speed regulating means associated with each motor and responsive to the voltage of said source for automatically varying the resistance in the secondary circuit of the motor with which it is associated, so that the same percentage change in the speeds of all the motors is produced when the voltage is changed.

6. In combination, a plurality of induction motors having phase wound secondary windings, a variable resistance in the secondary circuit of each motor, a source of electrical energy connected to the primary windings of said motors, a generator driven by each motor, means for arbitrarily regulating said source to change the voltage thereof, and speed regulating means for each motor comprising means for varying the resistance in the secondary of the motor with which it is associated, and a balance relay for controlling the operation of the resistance varying means having one coil responsive to the voltage of said source and an opposing coil responsive to the voltage of the generator driven by the motor.

7. In combination, a plurality of induction motors having phase wound secondary windings, a variable resistance in the secondary circuit of each motor, a source of electrical energy connected to the primary windings of said motors, a generator driven by each motor and adapted to deliver a voltage which varies directly with the speed thereof, means for arbitrarily regulating said source to change the voltage thereof, and speed regulating means for each motor comprising means for varying the resistance in the secondary of the motor with which it is associated, and a balance relay for controlling the operation of the resistance varying means having one coil responsive to the voltage of said source and an opposing coil responsive to the voltage of the generator driven by the motor.

8. In combination, an induction motor having a phase wound secondary winding, a variable resistance in the secondary circuit of said motor, a source of electrical energy connected to the primary winding of said motor, means for arbitrarily regulating said source to change an electrical condition of the energy supplied to said motor, and speed regulating means responsive to said electrical condition of the source for automatically varying said resistance so that the speed of the motor is changed the same per cent as said electrical condition when the latter is changed.

9. In combination, an induction motor having a phase wound secondary winding, a variable resistance in the secondary circuit of said motor, a source of electrical energy connected to the primary winding of said motor, means for arbitrarily regulating said source to change an electrical condition of the energy supplied to said motor, and speed regulating means responsive to said electrical condition of the source for automatically varying said resistance so that the speed of the motor is maintained constant at a predetermined value when said electrical condition of the source remains constant and so that the speed thereof is changed the same per cent as the electrical condition when the latter is changed.

10. In combination, an induction motor having a phase wound secondary winding, a variable resistance in the secondary circuit of said motor, a source of electrical energy connected to the primary winding of said motor, means for arbitrarily regulating said source to change the voltage supplied to said motor and speed regulating means responsive to the voltage of the source for automatically varying said resistance so that the speed of the motor is changed the same per cent as said voltage when the latter is changed.

11. In combination, an induction motor having a phase wound secondary winding, a variable resistance in the secondary circuit of said motor, a source of electrical energy connected to the primary winding of said motor, means for arbitrarily regulating said source to change the voltage supplied to said motor, and speed regulating means responsive to the voltage of the source for automatically varying said resistance so that the speed of the motor is maintained constant at a predetermined value when the voltage of the source remains constant and so that the speed thereof is changed the same per cent as to voltage when the latter is changed.

12. In combination, an induction motor having a phase wound secondary winding, a variable resistance in the secondary circuit of said motor, a source of electrical energy connected to the primary winding of said motor, a generator driven by said motor, means for arbitrarily regulating said source to change the voltage thereof, and speed regulating means for said motor comprising means for varying said resistance, and a balance relay for controlling the operation of said resistance, varying means having one coil responsive to the voltage of said source and an opposing coil responsive to the voltage of the generator driven by the motor.

13. In combination, an induction motor having a phase wound secondary winding, a variable resistance in the secondary circuit of said motor, a source of electrical energy connected to the primary winding of said motor, a generator driven by said motor and adapted to deliver a voltage which varies directly with the speed thereof, means for arbitrarily regulating said source to change the voltage thereof, and speed regulating means for said motor comprising means for varying said resistance, and a balance relay for controlling the operation of said resistance varying means having one coil responsive to the voltage of said source and an opposing coil responsive to the voltage of the generator driven by the motor.

14. In combination with an induction motor having a phase wound secondary winding, an alternating current generator adapted to supply current to the primary winding of said motor, means for operating said generator at different speeds to deliver currents at different frequencies to said motor, a variable resistance in the secondary circuit of said motor, and means for automatically varying said resistance to maintain a predetermined relation between the speed of said motor and the synchronous speed thereof as the frequency of the current supplied thereto is varied.

15. In combination with an induction motor having a phase wound secondary winding, an alternating current generator adapted to supply current to the primary winding of said motor, means for operating said generator at different speeds to deliver currents at different frequencies to said motor, means for regulating said generator to deliver a voltage which varies with the frequency, a variable resistance in the secondary circuit of said motor, and means responsive to said voltage for automatically varying said resistance to maintain a predetermined relation between the speed of said motor and the synchronous speed thereof as the frequency of the current supplied thereto is varied.

16. In combination with an induction motor having a phase wound secondary winding, an alternating current generator adapted to supply current to the primary winding of said motor, means for operating said generator at different speeds to deliver currents at different frequencies to said motor, means for regulating said generator to deliver a voltage which varies with the frequency, a variable resistance in the secondary circuit of said motor, a generator driven by said motor and adapted to deliver a voltage which varies directly with the speed thereof, and speed regulating means for said motor comprising means for varying the amount of resistance in the secondary circuit, and a balance relay having one coil responsive to the voltage of said alternating current generator and an opposing coil responsive to the voltage of the generator driven by said motor for controlling the operation of said resistance varying means so that a predetermined relation between the speed of said motor and the synchronous speed thereof is maintained when the frequency of the current supplied thereto is varied.

In witness whereof, I have hereunto set my hand this 7th day of August, 1919.

HARRY A. LAYCOCK.